(12) United States Patent
McDaniel (10) Patent No.: US 11,977,906 B1
(45) Date of Patent: May 7, 2024

(54) METHOD FOR GENERATING NO-CODE AUTOMATED CYBERSECURITY TASKS

(71) Applicant: EJ2 Communications, Inc., New York, NY (US)

(72) Inventor: Austin McDaniel, West Palm Beach, FL (US)

(73) Assignee: EJ2 Communications, Inc., New York, NY (US)

( * ) Notice: Subject to any disclaimer, the term of this patent is extended or adjusted under 35 U.S.C. 154(b) by 11 days.

(21) Appl. No.: 17/520,102

(22) Filed: Nov. 5, 2021

Related U.S. Application Data (60) Provisional application No. 63/110,636, filed on Nov. 6, 2020.

(51) Int. Cl.
*G06F 3/00* (2006.01)
*G06F 9/455* (2018.01)
*G06F 9/54* (2006.01)

(52) U.S. Cl.
CPC .......... *G06F 9/45512* (2013.01); *G06F 9/541* (2013.01)

(58) Field of Classification Search
CPC ....................................... G06F 9/541
USPC .......................................... 719/310
See application file for complete search history.

(56) References Cited

U.S. PATENT DOCUMENTS

| | | | | |
|---|---|---|---|---|
| 8,020,131 | B1 * | 9/2011 | Van Mau | G06F 30/34 716/117 |
| 9,459,848 | B1 * | 10/2016 | Horie | G06F 8/427 |
| 10,409,560 | B1 * | 9/2019 | Bebee | G06F 8/4441 |
| 10,871,950 | B2 * | 12/2020 | De Smet | G06F 16/9024 |
| 2010/0153933 | A1 * | 6/2010 | Bohlmann | G06F 8/73 717/144 |
| 2013/0007683 | A1 * | 1/2013 | Arbel | G06F 30/327 716/112 |
| 2016/0124723 | A1 * | 5/2016 | Ma | G06F 16/00 717/144 |
| 2017/0048276 | A1 * | 2/2017 | Bailey | G06F 3/0482 |
| 2017/0257385 | A1 * | 9/2017 | Overson | H04L 63/1416 |
| 2019/0303108 | A1 * | 10/2019 | Fu | G06N 7/01 |
| 2019/0373472 | A1 * | 12/2019 | Smith | H04L 9/3239 |
| 2020/0057681 | A1 * | 2/2020 | Mamaghani | G06F 11/3648 |
| 2020/0327252 | A1 * | 10/2020 | Mcfall | G06F 21/78 |

(Continued)

FOREIGN PATENT DOCUMENTS

| | | | | |
|---|---|---|---|---|
| CN | 104820587 | A * | 8/2015 | |
| CN | 112860356 | A * | 5/2021 | ............. G06F 8/425 |
| WO | WO-2007000015 | A1 * | 1/2007 | ............... G06F 8/42 |

OTHER PUBLICATIONS

Aleksejs Grocevs, Modern programming assignment verification, testing and plagiarism detection approaches. (Year: 2017).*

(Continued)

*Primary Examiner* — Lechi Truong
(74) *Attorney, Agent, or Firm* — LOWENSTEIN SANDLER LLP (57) ABSTRACT

Aspects of the disclosure provide for mechanisms for generating interactive screenshot based on a static screenshot. A method of the disclosure includes receiving metadata associated with an application programming interface (API) call, generating, based on the metadata, an abstract syntax tree (AST), and responsive to receiving an input directed to the metadata, generating, based on the AST, an expression to modify the metadata based on the input.

15 Claims, 5 Drawing Sheets

(56) References Cited

U.S. PATENT DOCUMENTS

2021/0026605 A1\* 1/2021 Evangelopoulos .... G06N 3/084
2021/0096832 A1\* 4/2021 Rich .................... G06F 40/154
2021/0216434 A1\* 7/2021 Stelmar Netto ...... G06F 9/4484

OTHER PUBLICATIONS

Michael D. Feist, Visualizing Project Evolution Through Abstract Syntax Tree Analysis. (Year: 2016).\*
Jeffrey L. Overbey, Immutable Source-Mapped Abstract Syntax Tree: A Design Pattern for Refactoring Engine APIs. (Year: 2013).\*

\* cited by examiner

```
┌─────────────────────────────────────────────────────────────────────────┐
│  Generate, based on a plurality of programming actions, a flow diagram to perform a  │
│                           cybersecurity task. 410                           │
└─────────────────────────────────────────────────────────────────────────┘
                                      │
                                      ▼
┌─────────────────────────────────────────────────────────────────────────┐
│         Select, from the flow diagram, a programming action to modify. 420          │
└─────────────────────────────────────────────────────────────────────────┘
                                      │
                                      ▼
┌─────────────────────────────────────────────────────────────────────────┐
│   Generate, based on the selected programming action, an abstract syntax tree (AST). │
│                                    430                                   │
└─────────────────────────────────────────────────────────────────────────┘
                                      │
                                      ▼
┌─────────────────────────────────────────────────────────────────────────┐
│   Provide, based on the AST, a plurality of input options to modify an output of the │
│                       selected programming action. 440                      │
└─────────────────────────────────────────────────────────────────────────┘
                                      │
                                      ▼
┌─────────────────────────────────────────────────────────────────────────┐
│  Responsive to selecting one of the plurality of input options to modify the output of the │
│ selected programming action, generate an expression to modify an input of the selected │
│                           programming action. 450                           │
└─────────────────────────────────────────────────────────────────────────┘
```

METHOD FOR GENERATING NO-CODE AUTOMATED CYBERSECURITY TASKS

RELATED APPLICATIONS

This patent application claims the benefit under 35 U.S.C. § 119(e) of U.S. Provisional Application No. 63/110,636, filed Nov. 6, 2020, which is incorporated by reference herein.

TECHNICAL FIELD

The present disclosure is generally related to computer systems, and more particularly, to generate no-code automated cybersecurity tasks.

BACKGROUND

Computers, servers, mobile devices, electronic systems, networks, and other technologies are widely used by small and large entities, such as, governments, military, corporate, financial, and medical organizations to collect, process, and store unprecedented amounts of data. Typically, the data collected, processed, and stored on these technologies requires protection against intrusion, unauthorized use, and vandalism, theft, extortion, loss of privacy and confidentiality of personal information, malicious mischief, damage to equipment, business process compromise, and the general activity of cybercriminals, etc. Thus, cybersecurity has been implemented through various technologies, processes, and practices to protect networks, devices, programs, and data from attack, damage, or unauthorized access.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for generating no-code automated cybersecurity tasks. Cybersecurity (e.g., information technology security) refers to the collective methods, technologies, and processes to help protect the confidentiality, integrity, and availability of computer systems, networks and data, against cyber-attacks or unauthorized access. Additionally, cybersecurity protects all organizational assets from both external and internal threats. Organizational assets are made up of multiple disparate systems, an effective and efficient cybersecurity posture requires coordinated efforts across all its information systems.

Typically, cybersecurity engineers are tasked with identifying threats and vulnerabilities in these organizational assets, then developing and implementing high-tech solutions to defend against hacking, malware, ransomware, insider threats, and all types of cybersecurity issues. In some situations, cybersecurity engineers may utilize various tools to identify threats and develop solutions. However, in some situations further coding is required to fully identify and develop solutions, especially across various disparate systems, which require cybersecurity engineers to have a specific level of programming experience to accomplish.

Aspects of the present disclosure address the above and other deficiencies by having a processing device generate no-code automated cybersecurity tasks (e.g., a cybersecurity script). The processing device provides a series of programming actions (i.e., commands or tasks carried out by a program code) configured to perform individual aspects of cybersecurity task. The processing device facilitates utilization of the programming codes to generate a flow diagram which represents the ordered flow of a cybersecurity task. The programming actions may include data access programming action, data modification programming action, structural programming actions, and an output programming action. Based on the generated flow diagram, the processing device may generate a script that automatically performs the cybersecurity task associated with the ordered flow represented in the flow diagram. The processing device may further modify various programming actions, such as, any data modification programming actions represented in the flow diagram.

The processing device may modify, for example, data modification programming actions by providing a menu containing a plurality of entries each corresponding to a dynamic and/or static data items of input data. Input data may be associated with data retrieved by an application programming interface (API) associated with an internal or external service, for example, cloud service. Prior to providing the menu, the processing device generates an abstract syntax tree (AST) from the input data, and thereafter extracts dynamic and/or static data items from the AST to populate the menu. The processing device may generate an expression associated with the menu selection used to modify the data modification programming action to include in the cybersecurity script. The expression may be syntax in a programming language of the API (e.g., domain specific language (DSL)) used to determine the data items of interest in the input data.

Advantages of the present disclosure include, but are not limited to, provide users without programming experience the ability to generate robust cybersecurity scripts containing code to perform intended functions that include extracting, modifying, and filtering specific data from data retrieved by a cloud service or extracting, modifying, filtering, and transferring specific data across multiple cloud services. Various aspects of the above referenced methods and systems are described in details herein below by way of examples, rather than by way of limitation.

Figure 1:
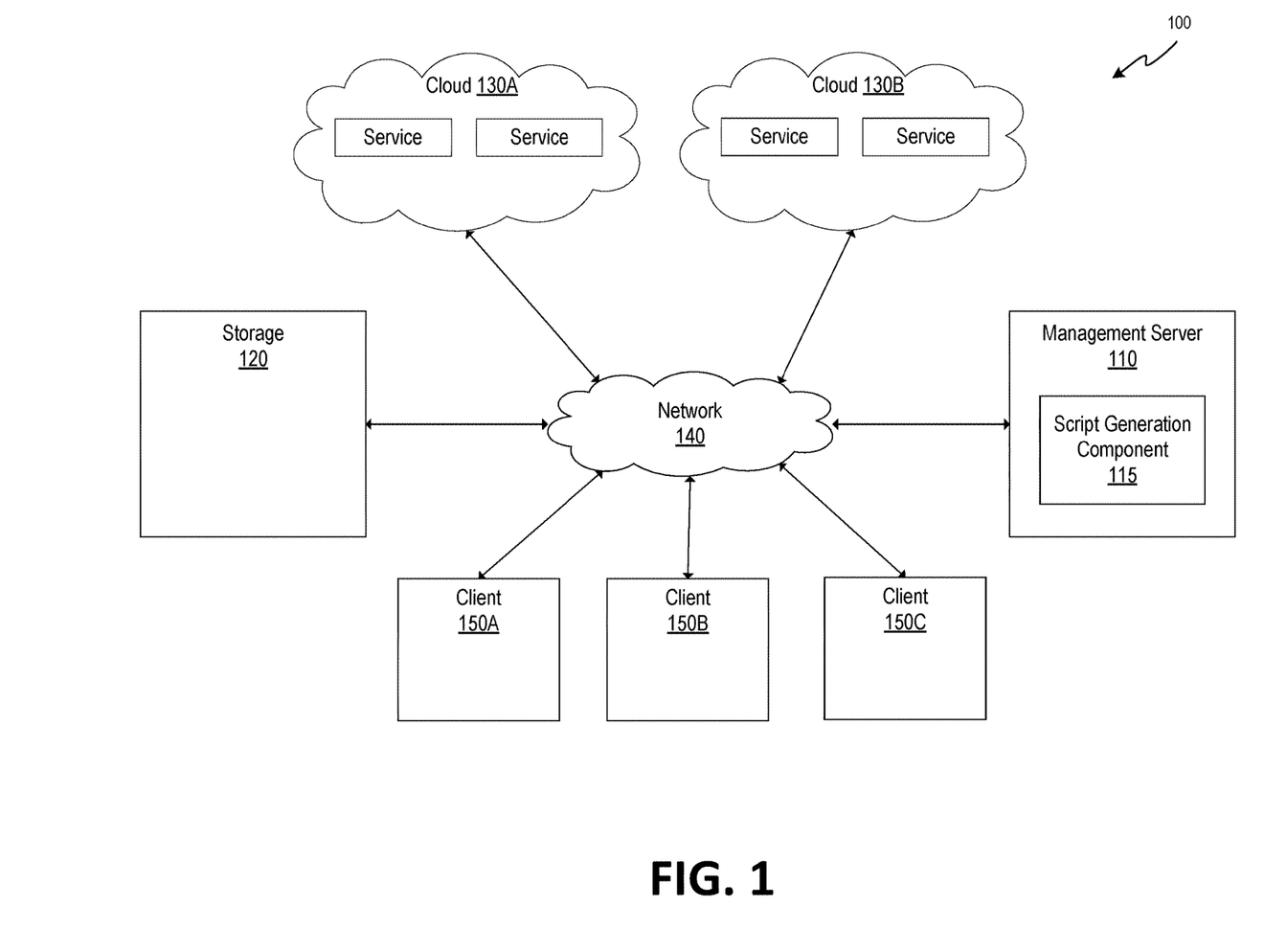
FIG. 1 depicts an exemplary system for generating no-code automated cybersecurity tasks, in accordance with one or more aspects of the present disclosure.

FIG. 1 is a block diagram of a computing infrastructure architecture 100 in which embodiments of the invention may operate. The computing infrastructure architecture 100 may include a cloud(s) 130A, 130B managed by various cloud provider systems. There may be any number of cloud(s) and cloud provider systems. For brevity and simplicity, cloud(s)

130A, 130B are used as an example throughout this document. Cloud(s) 130A, 130B may deploy services. There may be any number of services being deployed in cloud(s) 130A, 130B. For brevity and simplicity, services in cloud(s) 130A, 130B is used as an example in architecture 100. The cloud provider system and cloud(s) 130A, 130B may be provided by, for example, a third party cloud provider or an organization including consumers of cloud(s) 130A, 130B. Users (e.g., clients) may interact with services of cloud(s) 130A, 130B using client computer systems, such as clients 150A, 150B, and 150C.

Clients 150A, 150B, 150C are connected to hosts and cloud(s) 130A, 130B via a network 140, which may be may be a private network (e.g., a local area network (LAN), a wide area network (WAN), intranet, or other similar private networks) or a public network (e.g., the Internet). Each client 150A, 150B, 150C may be a mobile device, a PDA, a laptop, a desktop computer, or any other computing device.

In one embodiment, the architecture 100 is coupled to a management server 110 via the network 140. The management server 110 may provide cybersecurity management services for the architecture 100. In some embodiments, the management server 110 may receive a request, for example, from a system administrator via a client 150A, 150B, 150C, to generate an automated script to perform a cybersecurity task on various aspects of the architecture 100 (e.g., the clients 150A, 150B, 150C, the services provided by cloud(s) 130A, 130B, the network, etc. The management server 110 may be a desktop computer, a laptop computer, a smartphone, a tablet computer, a server, a scanner, or any suitable computing device capable of performing the techniques described herein. In some implementations, the management server 110 can be (and/or include) one or more computing devices 700 of FIG. 5.

The management server 110 may include a cybersecurity script generation component 115. The cybersecurity script generation component 115 may be a software module executable by one or more general purpose and/or specialized hardware devices. The cybersecurity script generation component 115 may include instructions stored on one or more tangible, machine-readable media of the management server 110 and executable by one or more processing devices of the management server 110.

The cybersecurity script generation component 115 may select from a menu of available programming actions to create a flow diagram representative of an ordered flow of a cybersecurity task to be performed on the computing infrastructure architecture 100. For example, the flow diagram may include one or more programming actions that include at least one data access programming action coupled to at least one data modification programming action. The cybersecurity script generation component 115 may provide selection of the at least one data modification programming action to further modify input data associated with the data inputted into the at least one data modification programming action. To further modify the data inputted into the at least one data modification programming action, the cybersecurity script generation component 115 may generate an abstract tree (AST) based on the inputted data.

The cybersecurity script generation component 115 may generate a menu containing a plurality of entries each corresponding to a dynamic and/or static data items obtained from the AST. The cybersecurity script generation component 115 may provide selection of an entry from the menu to modify the inputted data. Upon selection of the entry from the menu, the cybersecurity script generation component 115 may generate an expression based on a data path corresponding to the data item associated with the entry by traversing the AST. The expression may be generated based on each node and branch of the AST in the DSL of the data imputed (i.e., DSL of the API used to retrieve the data from a cloud service). Once the flow diagram including modification to various programming actions are completed, the cybersecurity script generation component 115 may generate a cybersecurity script (e.g., script) based on the flow diagram which represents the ordered flow of the cybersecurity task. The cybersecurity script may include various expressions associated with the various programming actions to assist in execution of the cybersecurity task. The cybersecurity script generation component 115 may store the script in the storage 120. The cybersecurity script refers to a script, when executed, that automatically retrieves necessary data and performs relevant task without further input from a user. The storage 120 may reside locally or remotely, and may represent a single data structure or multiple data structures (databases, repositories, files, etc.) residing on one or more mass storage devices, such as magnetic or optical storage based disks, solid-state drives (SSDs) or hard drives.

Figure 2:
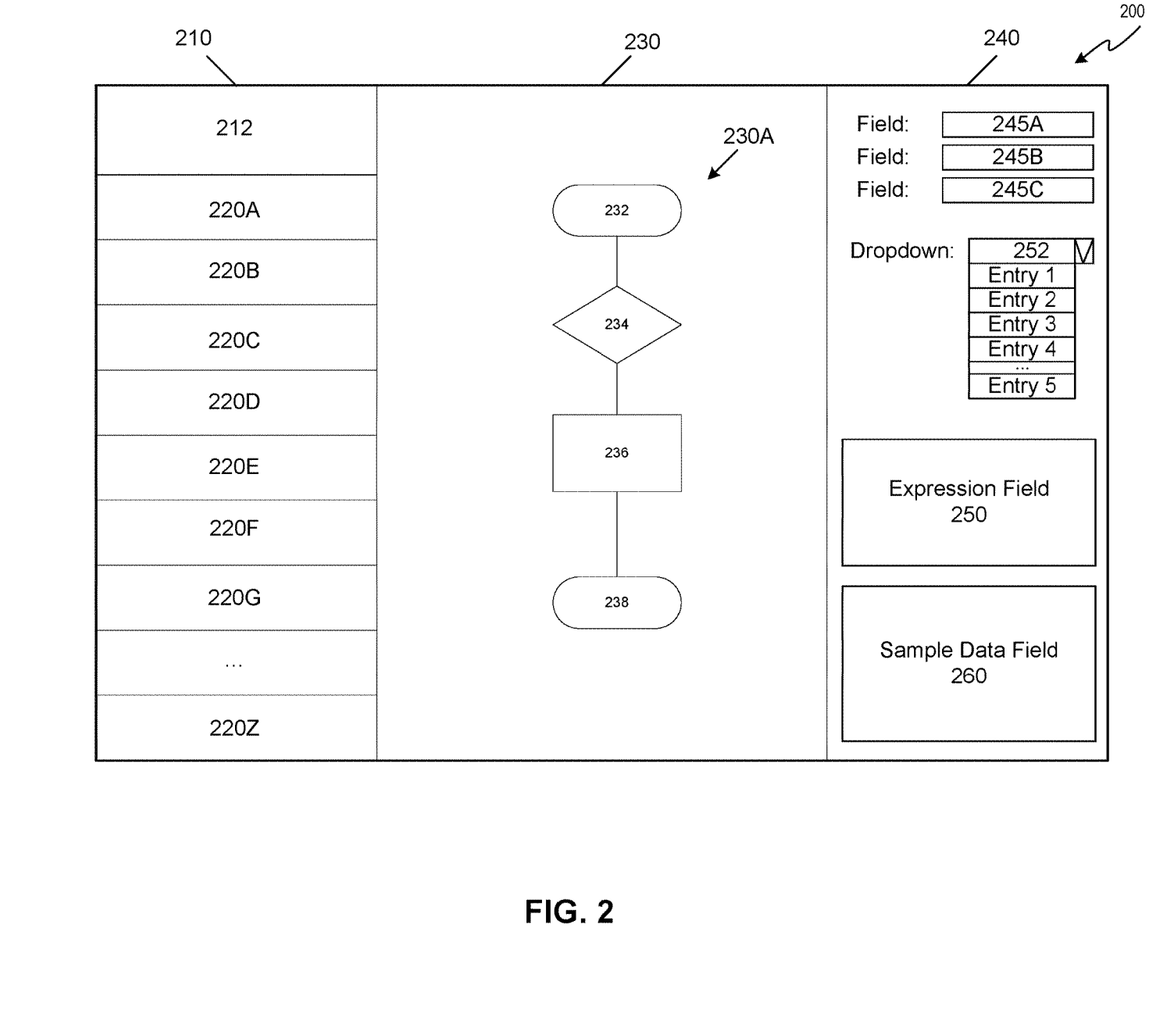
FIG. 2 depicts a block diagram of an example application for generating no-code automated cybersecurity tasks in accordance with one or more aspects of the present disclosure.

FIG. 2 illustrates an application 200 for generating no-code automated cybersecurity tasks in accordance with one or more aspects of the present disclosure. The application 200 (e.g., the cybersecurity script generation component 115) may be a software module running on the management server 110 of FIG. 1. The application 200 may be presented to a user (e.g., client 150A, 150B, 150C of FIG. 1) as a graphical user interface (GUI) to enable users to generate no-code automated cybersecurity tasks. The GUI of application 200 may include a selection region 210, a flow diagram region 230, and an editing region 240.

The selection region 210 may include a search field 212 to search a plurality of programming actions to be added to the flow diagram region 230. The programming actions may include data access programming actions to import data from cloud services (e.g., services of cloud(s) 130A, 130B of FIG. 1), structural programming actions to implement conditional statements (e.g., for loops, while loops, if-then statements, etc.), data modification programming actions (e.g., modifiers used to extract, filter, or modify input data), output programming actions (e.g., functions output data to a cloud service or storage device, functions to generate the cybersecurity script, etc.). Each of the programming actions may be organized or grouped into various menus (e.g., 220A-220Z) of the selection region. The various menus (e.g., 220A-220Z) of the selection region may be any suitable combination of pull-down menus, static menus, and/or any other type of menus that organizes and/or groups the programming actions in an easily identifiable manner. The various menus (e.g., 220A-220Z) of the selection region may be expanded and traversed by hovering or clicking a menu of interest from the various menus (e.g., 220A-220Z) of the selection region.

The application 200 may use the data access programming action to retrieve data from a cloud service (e.g., services of cloud(s) 130A, 130B of FIG. 1) via an application programming interface (API). The application 200 may provide additionally customization to the data access programming action to establish a source, frequency, and/or trigger for retrieving data from the cloud service. For example, application 200 may indicated based on the selected data-access programming action to retrieve data from a cloud service via an API at a preset interval. In another example, application 200 may indicated based on the selected data-access programming action data to retrieve data from a cloud service via an API in response to a particular condition (e.g., a predetermined number of alerts issued by the cloud service). The application 200 may display an intended output of the retrieved data from the cloud service associated with the data access programming action in a sample data field 260 of the editing region 240 as sample data.

To retrieve data from the cloud service, the application 200 may receive input with respect to credentials associated with the various cloud services (e.g., cloud(s) 130A, 130B of FIG. 1) to facilitate access to cloud services via the data access programming action (e.g., API calls associated with the data access programming action). Depending on the embodiment, the generated cybersecurity script may include credentials and information to automate connections with the cloud services. In some embodiments, application 200 may support multiple data access programming actions corresponding to various cloud services, thereby facilitating complex cybersecurity tasks that require access to multiple cloud services.

The application 200 may use the structural programming action to provide comparison, looping, and conditional functionality to other programming actions. The structural programming action provides more flexibility and creativity in creating cybersecurity task for more complex situations. The application 200 may use structural programming action to facilitate input to determine various elements of the structural programming action, such as, number of iterations or any other suitable conditions used to dictate reiteration of a programming actions coupled to the structural programming action. Depending on the embodiment, if an output data of a programming action coupled to the structural programming action includes multiple data items (e.g., an array), the application 200 may automatically insert a structural data programming action to loop through the multiple data items (e.g., iterating through the array).

The application 200 may use data modification programming action to extract or modify inputted data (e.g., output of a data access programming action). The data modification programming action may include various modifier that, for example, represent extraction of particular data from the inputted data, such as, a list of IP addresses, a list of email addresses, a list of names, a list of geolocations, a pathname, and/or other data that can be extracted from the inputted data. In some embodiments, the various modifiers may also include, for example, common function that may be applied to inputted data, such as, a counting function to count the number of elements in a particular array, a string length function to count the length of a string, or a redaction function to redact personal identifying information. Accordingly, the modifiers are applied to complex data objects (e.g., XML, JSON, or any other complex data object) of the inputted data. As a result of the data modification programming action, the application 200 outputs the inputted data modified by the modifier which represents the inputted data after modification. Depending on the embodiment, application 200 may display the intended output of the data modification programming action in the sample data field 260 of the editing region 240 as sample data.

The data modification programming action provides the user the ability to extract and modify inputted data without inputting code (e.g., an expression). In some embodiments, application 200 may generate a default expression associated with the data modification programming action and display the expression in an expression field 250 of the editing region 240. Application 200 may provide the ability to modify the default expression associated with the data modification programming action, thereby, causing the intended output of the data modification programming action displayed in the sample data field 260 to change. For example, the expression field 250 may be editable in which application 200 may receive an input (e.g., string) in the expression field 250, thereby, updating the default expression and altering the data-modification programming action. The inputted string is provided to users that are familiar with the DSL associated with the inputted data.

Depending on the embodiment, application 200 may use the output programming action to output the inputted data to a connected cloud (e.g., cloud(s) 130A, 130B of FIG. 1). For example, the output programming action may be an email alert using a cloud service, assignment of a new tasks to individuals within a project management cloud service, deletion of suspicious accounts via a cloud service, or any other suitable action that can be executed or performed on a cloud service. In some embodiments, application 200 may use the output programming action to indicate the termination of the cybersecurity task (e.g., the end of the flow diagram 230A), thereby generating a cybersecurity script.

Application 200 uses the flow diagram region 230 to create a flow diagram 230A associated with to present an ordered flow of a cybersecurity task. As result of the, application 200 implements drag-and-drop functionality to the selection region 210. Accordingly, to add a programming action to the flow diagram region 230, application 200 may identify a drag-and-drop actions in which the programming action is selected and dragged from the selection region 210 to the flow diagram region 230 and released within the flow diagram region 230. The programming action may be presented in the flow diagram region 230 by an icon (e.g., 232, 234, 236, and 238) which is rendered based on the programming action selected. In some embodiments, to add the programming action to the flow diagram region 230 from the selection region 210, application 200 may identify, for example, button selection (e.g., add to flow diagram selection button), double clicking of the programming action, or any other suitable input to identify selection of the programming action for inclusion in the flow diagram region 230.

Application 200 may facilitate arrangement of the icons associated with the programming actions in a specific order to create flow diagram 230A which can be used to generate the cybersecurity script to be executed. Initially, the flow diagram region 230 starts with a blank space to receive programming actions from the selection region 210. With each selection of a programming action, the icons (e.g., 232, 234, 236, and 238) are rendered in the flow diagram region 230, thereby representing the inclusion of the selected programming actions in the flow diagram 230A. Additionally, spatial position of each of the icons and their connections provide additional information regarding understating flow diagram 230A. For example, spatial position and connections of the flow diagram 230A may provide information regarding inputs, outputs, and/or functionality of the programming actions associated with the icons.

Application 200 may obtain information regarding inputs, outputs, and/or functionality of the programming actions, by detecting spatial location of a first icon (e.g., icon 232) associated with a first programming action with respect to a second icon (e.g., icon 234) associated with a second programming action. For example, the application detects whether the input of icon 234 associated with the second programming action coincides with the output of icon 232 associated with the first programming action. Accordingly, by position a programming action relative to another programming action, application 200 may define input and output relationships between programming actions in the ordered flow of the cybersecurity task. Depending on the embodiment, relationships between the programming actions may be defined by lines connecting the programming actions (e.g., line between icon 232 and icon 234) to represent the passing of data between the programming actions. Additionally, the application 200 may graphically represent structural programming actions as (e.g., icons) such that the corresponding conditions (e.g., for loops or while loops) may be represented in the ordered flow of the cybersecurity task.

Depending on the embodiment, the flow diagram region 230 may provide graphical indicators to indicate errors detected in the ordered flow of the cybersecurity task based on connections between programming actions that are inaccurate (e.g., a data modification containing no input). For example, application 200 may display a red "x" between the connections or next to the corresponding icon indicating that a necessary input to a programming action represented by the data modification programming action has not been defined. Additionally, the flow diagram region 230 may provide graphical indicators to indicate that the connections between programming actions are suitable, for example, a green square between the connections or next to the corresponding icon indicating that all inputs for a programming action have been defined.

As flow diagram 230A is created in the flow diagram region 230, application 200, in real-time, displays the intended output of the flow diagram 230A in the sample data field 260 of the editing region 240, thereby, enabling constant awareness of the cybersecurity task during creation. As previously described, the cybersecurity script is generated based on the flow diagram 230A in the flow diagram region 230. In particular, application 200 may compile the flow diagram 230A into a cybersecurity script based on the ordered flow of the cybersecurity task associated with each programming actions of flow diagram 230A which may include at least one data-access programming actions, at least one data-modification programming actions, at least one of structural programming actions, and/or at least one of output programming actions, or any suitable combination of programming actions. In some embodiments, the application 200 may receive an input regarding the preferred programming language (e.g., from a list of supported programming language) to generate the cybersecurity script.

The editing region 240 may include a plurality of field 245A and B, an expression field 250, a dropdown field 252 coupled to the expression field 250, and a sample data field 260. Application 200 may receive input associated with a selection of the icons (e.g., 232, 234, 236, 238) in the flow diagram region 230 associated with a programming action of the selection region 210 and pre-populate the plurality of fields 245A and B with information associated with the programming action. Information associated with the programming action may include, for example, a label of the programming action, credentials and connection information regarding a cloud service with respect to a data access operation, and any other suitable information relevant to the programming action associated with the selected icon. Depending on the embodiment, the plurality of fields 245A and B may be (e.g., text or menu selection) corresponding to configurable inputs, outputs, functional options, and/or expressions associated with the selected icon. Depending on the embodiment, the number of field 245A-C may be dynamically adjusted based on the amount of information relevant to the programming action associated with the selected icon.

The application 200 may generate an expression, based on the programming action associated with the selected icon (e.g., icon associated with a data modification programming action), to be displayed in the expression field 250. To generate the expression to be displayed in the expression field 250, application 200 may generate an abstract syntax tree (AST) based on the inputted data of the programming action associated with the selected icon. Depending on the embodiment, application 200 may traverse (e.g., query) the AST to populate the dropdown field 252, which provides selection of a specific entry (e.g., entry 1 to entry 5) in which each entry corresponds to a single data item or a grouping of data items extracted from the inputted data of the programming action associated with the selected icon. Depending on the embodiment, each entry may be in natural language analogous to DSL of the inputted data. Depending on the embodiment, application 200 may distinguish between static schema (e.g., labels or data structure elements) and dynamic schema (e.g., variable data) of the inputted data associated with the selected icon based on the generated AST.

Depending on the embodiments, the specific entry of the dropdown field 252 may further include modifiers to apply to the inputted data associated with the selected icon. As described previously, modifiers may include, for example, extractors use to extract particular data from the inputted data, such as, a list of IP addresses, a list of email addresses, a list of names, a list of geolocations, a pathname, or common function to manipulate the inputted data, such as, counting function, string length function, redaction function, string modifiers (e.g., anonymize function), mathematical computations (e.g., addition function), etc. Accordingly, application 200 provides the ability to select from the dropdown field 252 entries in natural language directed to specific data or grouping of specific data from the inputted data and modifiers to filter and manipulate the inputted data at runtime without entering a single line of code (e.g., an expression). In particular, in view of various changes that typically occur to API's of cloud services, application 200 does not require pre-existing knowledge of the various components of the data returned by the API.

Figure 3:
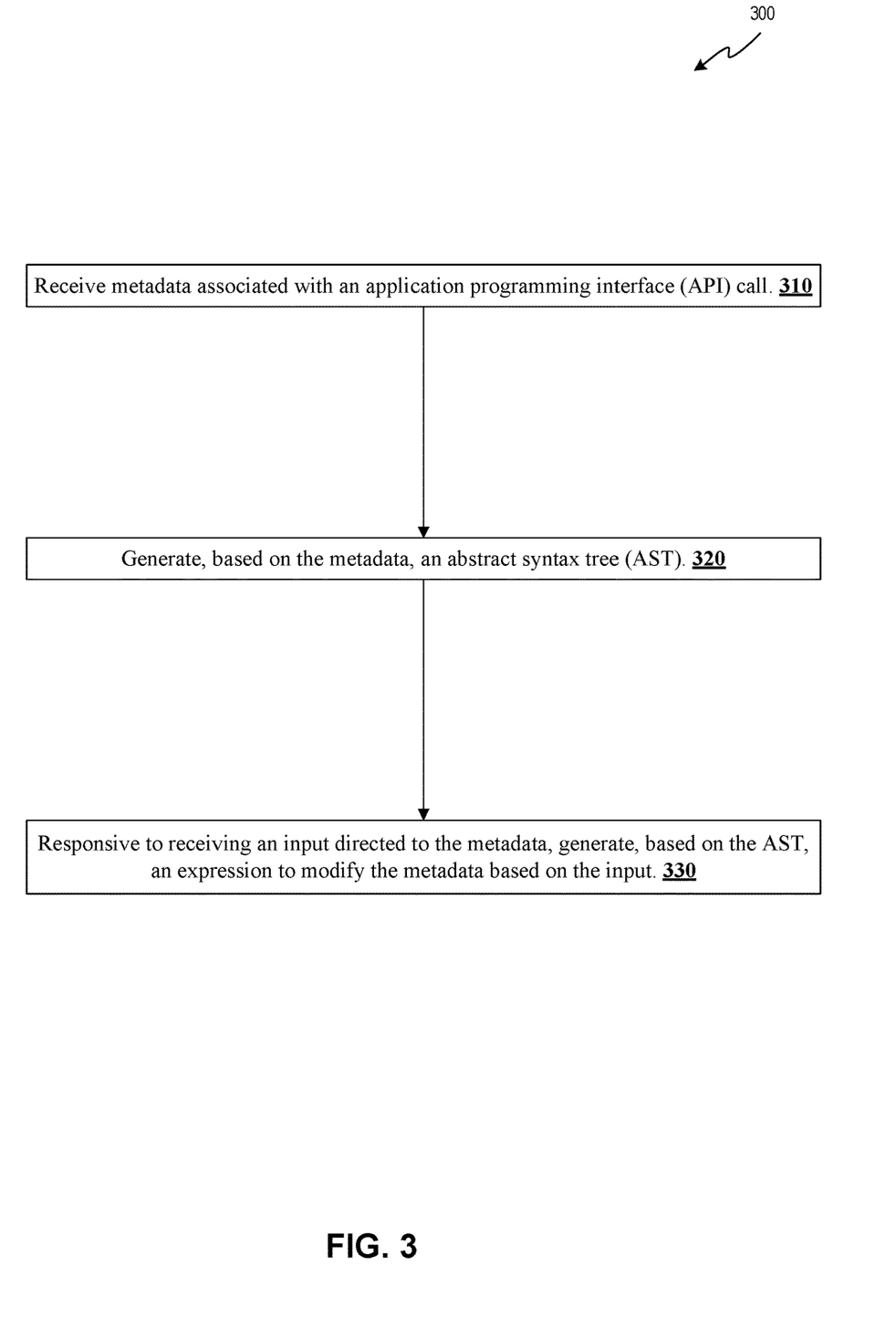
FIG. 3 depicts a flow diagram of an example method for generating no-code automated cybersecurity tasks, in accordance with one or more aspects of the present disclosure.

FIG. 3 is a flow diagram of an example method 300 to generate no-code automated cybersecurity tasks, in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the cybersecurity script generation component 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 310, the processing logic receives metadata associated with an application programming interface (API) call. In some embodiments, the application programming interface call may be associated with a data access programming action used to retrieve data from a cloud service. At operation 320, the processing logic generates, based on the metadata, an abstract syntax tree (AST).

At operation 330, responsive to receiving an input directed to the metadata, the processing logic generates, based on the AST, an expression to modify the metadata based on the input. The expression may be a syntax in a domain specific language associated with the metadata of the API call. Depending on the embodiment, the input may be one of: a data item of the metadata or a modifier. As described previously, input may be determined by traversing and extracting from the AST each data item of the metadata.

In some embodiments, responsive to receiving the data item of the metadata as the input directed to the metadata, the processing logic generates, based on the AST, the expression to modify the metadata based on the input includes traversing the AST to extract the data item from the metadata. As previously described, the expression may be generate based on a data path corresponding to the input or data associated with the input by traversing the AST.

In some embodiments, responsive to receiving the modifier as the input directed to the metadata, the processing logic generates, based on the AST, the expression to modify the metadata based on the input includes traversing the AST to extract at least one data item from the metadata according to the modifier. As described previously, modifiers may include, for example, extractors use to extract particular data from the inputted data, such as, a list of IP addresses, a list of email addresses, a list of names, a list of geolocations, a pathname, or common function to manipulate the inputted data, such as, counting function, string length function, redaction function, string modifiers (e.g., anonymize function), mathematical computations (e.g., addition function), etc. Thus, applying the modifier to the extracted at least one data item from the metadata.

Figure 4:
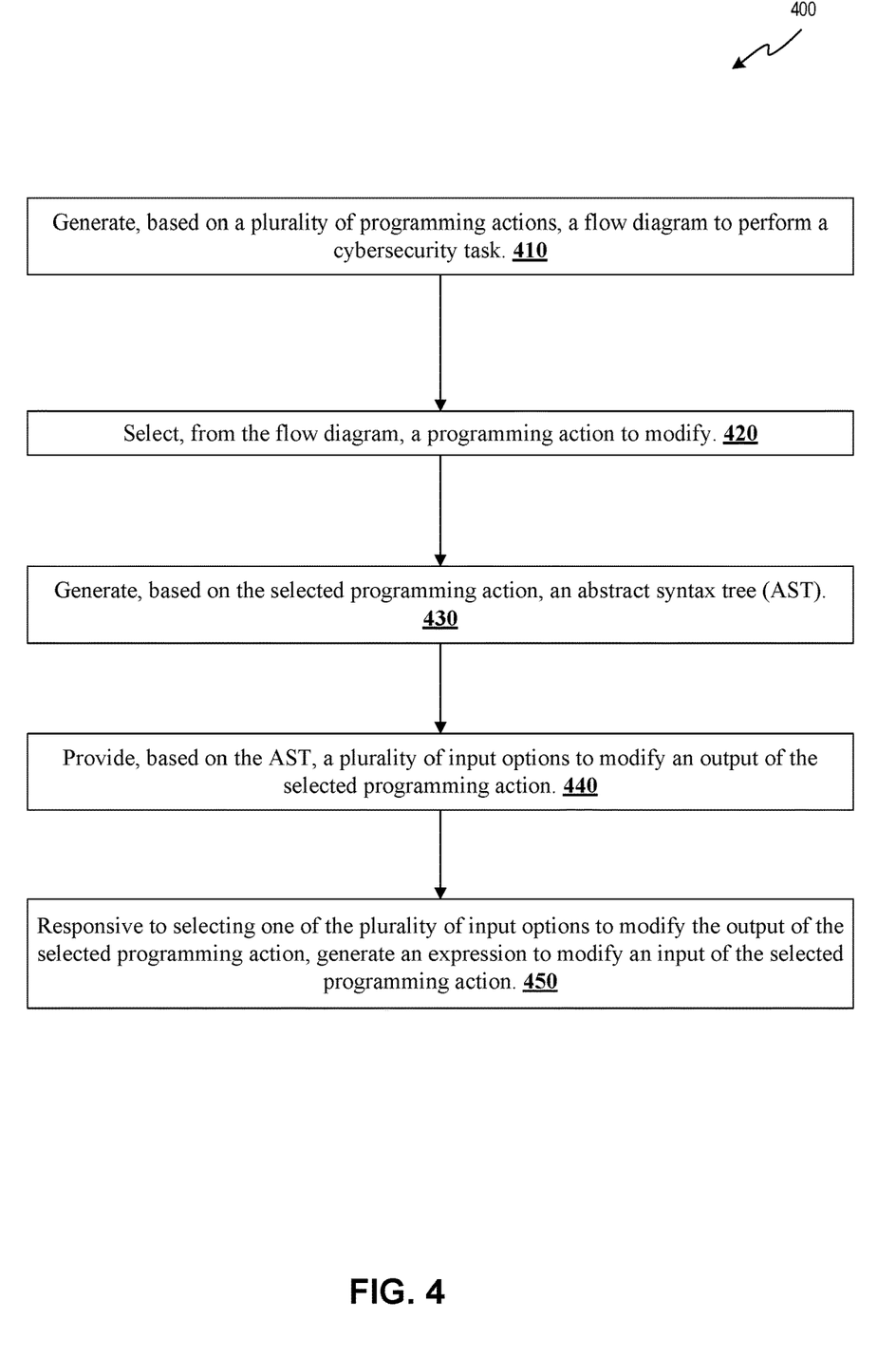
FIG. 4 depicts a flow diagram of an example method for generating no-code automated cybersecurity tasks, in accordance with one or more aspects of the present disclosure.

FIG. 4 is a flow diagram of an example method 400 to generate no-code automated cybersecurity tasks, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the cybersecurity script generation component 115 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, the processing logic generates, based on a plurality of programming actions, a flow diagram to perform a cybersecurity task. As previously described, data access programming actions to import data from cloud services, structural programming actions to implement conditional statements (e.g., for loops, while loops, if-then statements, etc.), data modification programming actions (e.g., modifiers used to extract, filter, or modify input data), output programming actions (e.g., functions output data to a cloud service or storage device, functions to generate the cybersecurity script, etc.).

At operation 420, the processing logic selects, from the flow diagram, a programming action to modify. For example, a data modification programming actions used to extract particular data, such as, a list of IP addresses, a list of email addresses, a list of names, a list of geolocations, a pathname, or common function to manipulate the inputted data, such as, counting function, string length function, redaction function, string modifiers (e.g., anonymize function), mathematical computations (e.g., addition function), etc.

At operation 430, the processing logic generates, based on the selected programming action, an abstract syntax tree (AST). In particular, the AST is generated based on data inputted into the selected programming action. At operation 440, the processing logic provides, based on the AST, a plurality of input options to modify an output of the selected programming action. The plurality of input options are determined based on traversing the AST to extract each data item from the input of the selected programming action, wherein each input option of the plurality of input options corresponds to each extracted data item. As described previously, each input option may be represented in natural language analogous to DSL of the extracted data item. Depending on the embodiment, the input option may be determined based on distinguishing between static schema (e.g., labels or data structure elements) and dynamic schema (e.g., variable data) of the extracted data item based on the AST.

At operation 450, responsive to selecting one of the plurality of input options to modify the output of the selected programming action, the processing logic generates an expression to modify an input of the selected programming action. As described previously, to generate the expression based, the processing logic generates the expression based on a data path corresponding to the selected input options by traversing the AST. The expression may be the DSL of the data input of the selected programming action (i.e., DSL of the API corresponding to the data access programming action).

In some embodiments, the processing logic generates a cybersecurity script based on the flow diagram, wherein the cybersecurity script includes the generated expression. In some embodiments, an output programming action may indicate the end of the flow diagram, thereby generating the cybersecurity script.

Figure 5:
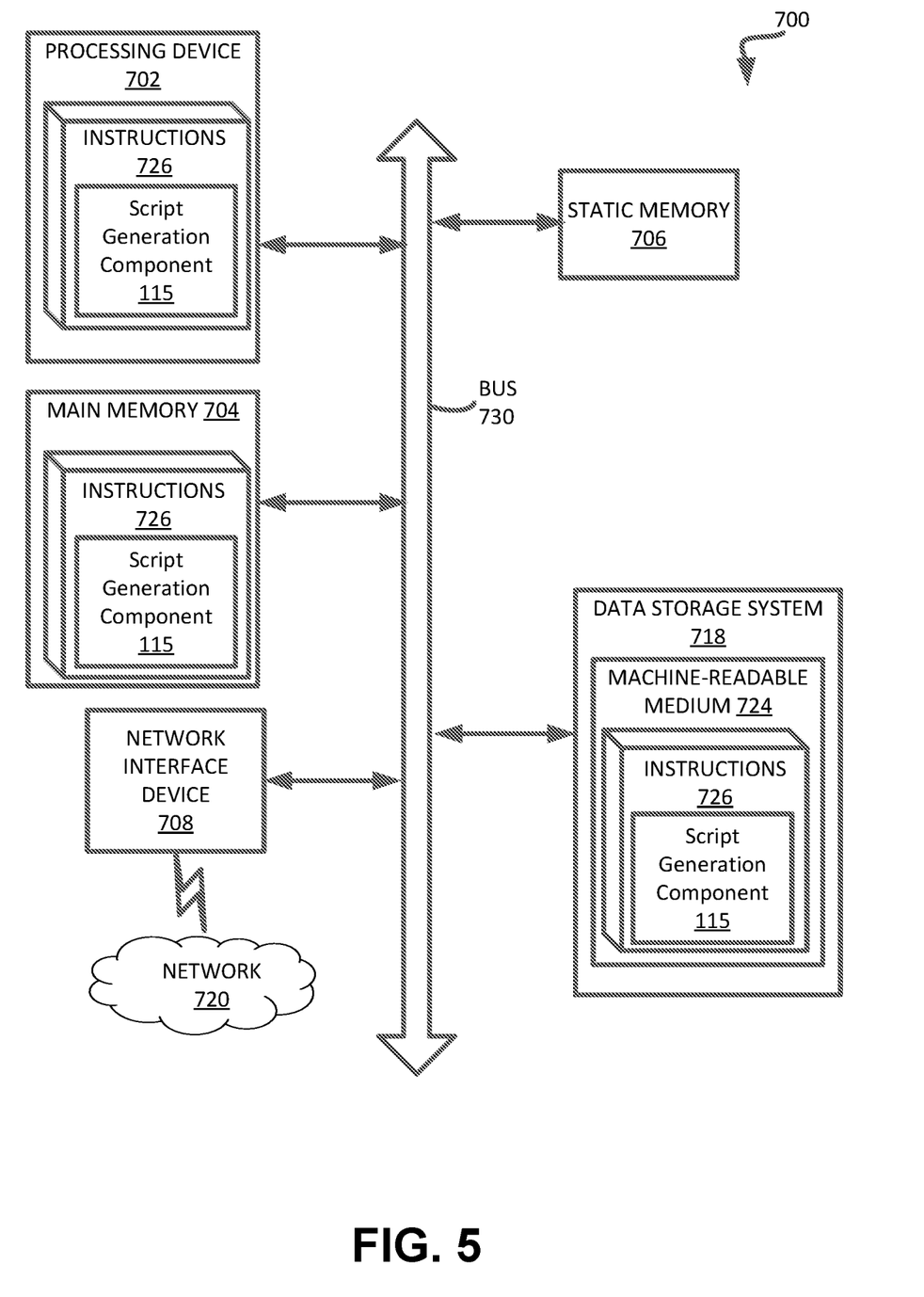
FIG. 5 depicts a block diagram of an illustrative computing device operating in accordance with the examples of the present disclosure.

FIG. 5 depicts an example computer system 700 which can perform any one or more of the methods described herein. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a set-top box (STB), a Personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The exemplary computer system 700 includes a processing device 702, a main memory 704 (e.g., read-only memory (ROM), flash memory, dynamic random access memory (DRAM) such as synchronous DRAM (SDRAM)), a static memory 706 (e.g., flash memory, static random access memory (SRAM)), and a data storage device 716, which communicate with each other via a bus 908.

Processing device 702 represents one or more general-purpose processing devices such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for implementing the cybersecurity script generation component 115 of FIG. 1 and to perform the operations and steps discussed herein (e.g., methods 300 of FIG. 3 and methods 400 of FIG. 4).

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker). In one illustrative example, the video display unit 710, the alphanumeric input device 712, and the cursor control device 714 may be combined into a single component or device (e.g., an LCD touch screen).

The data storage device 716 may include a computer-readable storage medium 724 on which is stored the instructions 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting computer-readable media. In some implementations, the instructions 726 may further be transmitted or received over a network via the network interface device 722.

While the computer-readable storage medium 724 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

In the above description, numerous details are set forth. It will be apparent, however, to one skilled in the art, that the aspects of the present disclosure may be practiced without these specific details. In some instances, well-known structures and devices are shown in block diagram form, rather than in detail, in order to avoid obscuring the present disclosure.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "selecting," "storing," "analyzing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may comprise a general purpose computer selectively activated or reconfigured by a computer program stored in the computer. Such a computer program may be stored in a computer-readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description. In addition, aspects of the present disclosure are not described with reference to any particular programming language. It will be appreciated that a variety of programming languages may be used to implement the teachings of the present disclosure as described herein.

Aspects of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read-only memory ("ROM"), random access memory ("RAM"), magnetic disk storage media, optical storage media, flash memory devices, etc.). The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" or "an implementation" or "one implementation" throughout is not intended to mean the same implementation or implementation unless described as such. Furthermore, the terms "first," "second," "third," "fourth," etc. as used herein are meant as labels to distinguish among different elements and may not necessarily have an ordinal meaning according to their numerical designation.

Whereas many alterations and modifications of the disclosure will no doubt become apparent to a person of ordinary skill in the art after having read the foregoing description, it is to be understood that any particular implementation shown and described by way of illustration is in no way intended to be considered limiting. Therefore, references to details of various implementations are not intended to limit the scope of the claims, which in themselves recite only those features regarded as the disclosure.

What is claimed is:

1. A system comprising:
a memory; and a processor, operatively coupled with memory, to perform operations comprising: receiving metadata from one or more services via an application programming interface (API) call;
generating, based on the metadata, an abstract syntax tree (AST);
providing, based on the AST, a menu comprising a plurality of entries, wherein each entry of the menu corresponds to a data item retrieved by the API call associated with the one or more services; receiving a selection of an entry of the menu to modify a data item of the metadata; and responsive to receiving the entry selection, generating, based on the entry selection, an expression to modify the metadata;
wherein responsive to receiving the modifier as the entry selection, generating the expression to modify the metadata includes traversing the AST to extract at least one data item from the metadata according to the modifier;
wherein the operations further comprises: applying the modifier to the extracted at least one data item from the metadata according to the modifier.

2. The system of claim 1, wherein the metadata may include dynamic schema and static schema.

3. The system of claim 1, wherein the entry selection is one of: a data item of the metadata or a modifier.

4. The system of claim 3, wherein responsive to receiving the data item of the metadata as the entry selection generating the expression to modify the metadata includes traversing the AST to extract the data item from the metadata.

5. The system of claim 3, wherein the modifier is one of: extraction of at least one data item from the metadata or manipulation of the at least one data item from the metadata.

6. The system of claim 1, wherein the expression refers to syntax in a domain specific language associated with the metadata of the API call.

7. A method comprising:
receiving metadata from one or more services via an application programming interface (API) call; generating, based on the metadata, an abstract syntax tree (AST);
providing, based on the AST, a menu comprising a plurality of entries, wherein each entry of the menu corresponds to a data item retrieved by the API call associated with the one or more services;
receiving a selection of an entry of the menu to modify a data item of the metadata; and responsive to receiving the entry selection, generating, based on the entry selection, an expression to modify the metadata;
wherein responsive to receiving the modifier as the entry selection, generating the expression to modify the metadata includes traversing the AST to extract at least one data item from the metadata according to the modifier;
applying the modifier to the extracted at least one data item from the metadata according to the modifier.

8. The method of claim 7, wherein the metadata may include dynamic schema and static schema.

9. The method of claim 7, wherein the entry selection is one of: a data item of the metadata or a modifier.

10. The method of claim 9, wherein responsive to receiving the data item of the metadata as the entry selection generating the expression to modify the metadata includes traversing the AST to extract the data item from the metadata.

11. The method of claim 9, wherein the modifier is one of: extraction of at least one data item from the metadata or manipulation of the at least one data item from the metadata.

12. The method of claim 7, wherein the expression refers to syntax in a domain specific language associated with the metadata of the API call.

13. A non-transitory computer-readable storage medium comprising instructions that, when executed by a processing device, cause the processing device to perform operations comprising:
generating, based on a plurality of programming actions, a flow diagram to perform a cybersecurity task, wherein the plurality of programming action comprises a data access programming action, a structural programming action, a data modification programming action, and an output programming action;
selecting, from the flow diagram, a programming action to modify; generating, based on the selected programming action, an abstract syntax tree (AST);
providing, based on the AST, a plurality of input options to modify an output of the selected programming action; and responsive to selecting one of the plurality of input options to modify the output of the selected programming action, generating an expression to modify an input of the selected programming action;

wherein the expression refers to syntax in a domain specific language associated with the input of the selected programming action, wherein the input of the selected programming action corresponds to data retrieved by an application programming interface (API) of a cloud service.

14. The non-transitory computer-readable storage medium of claim 13, wherein causing the processing device to further perform operations comprising: generating a cybersecurity script based on the flow diagram, wherein the cybersecurity script includes the generated expression.

15. The non-transitory computer-readable storage medium of claim 13, wherein the plurality of input options are determined based on traversing the AST to extract each data item from the input of the selected programming action, wherein each input option of the plurality of input options corresponds to each extracted data item.

\* \* \* \* \*